United States Patent
Shim et al.

(10) Patent No.: US 11,182,231 B2
(45) Date of Patent: Nov. 23, 2021

(54) HOST SYSTEM AND COMPUTING SYSTEM INCLUDING THE HOST SYSTEM

(71) Applicant: SK hynix Inc., Icheon (KR)

(72) Inventors: Eung-Bo Shim, Suwon (KR); Sung-Ki Choi, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/815,559

(22) Filed: Mar. 11, 2020

(65) Prior Publication Data
US 2021/0034446 A1 Feb. 4, 2021

(30) Foreign Application Priority Data

Jul. 31, 2019 (KR) .......................... 10-2019-0093267

(51) Int. Cl.
| | | |
|---|---|---|
| G06F 11/00 | (2006.01) | |
| G06F 11/07 | (2006.01) | |
| G06F 12/02 | (2006.01) | |
| G06F 11/30 | (2006.01) | |
| G06F 12/123 | (2016.01) | |
| G06F 11/10 | (2006.01) | |

(52) U.S. Cl.
CPC ........ *G06F 11/076* (2013.01); *G06F 11/0772* (2013.01); *G06F 11/1068* (2013.01); *G06F 11/3037* (2013.01); *G06F 12/0246* (2013.01); *G06F 12/123* (2013.01)

(58) Field of Classification Search
CPC ............... G06F 11/076; G06F 11/0772; G06F 11/3037; G06F 11/1068; G06F 12/0246; G06F 12/123
See application file for complete search history.

(56) References Cited

U.S. PATENT DOCUMENTS

2015/0278012 A1* 10/2015 Gjorup ................. G06F 11/076
714/704
2020/0192749 A1* 6/2020 Richter ............... G06F 11/1048

FOREIGN PATENT DOCUMENTS

| KR | 13744550000 B1 | 3/2014 |
| KR | 18623790000 B1 | 7/2018 |

OTHER PUBLICATIONS

"Low Power Double Data Rate 4," JEDEC Standard, Nov. 2015, p. 1-p. 265, JEDEC Solid State Technology Association, Arlington, VA, the U.S.A.

* cited by examiner

*Primary Examiner* — Samir W Rizk (57) ABSTRACT

A memory system suitable for counting the number of errors occurring in each memory location, and a host system suitable for detecting a defective memory location based on the number of the errors occurring in each memory location and controlling a repair operation for the defective memory location based on a current amount of data being processed between the host system and the memory system, wherein the memory system repairs the defective memory location using the redundant memory area.

18 Claims, 9 Drawing Sheets

HOST SYSTEM AND COMPUTING SYSTEM INCLUDING THE HOST SYSTEM

CROSS-REFERENCE TO RELATED APPLICATIONS

The present application claims priority of Korean Patent Application No. 10-2019-0093267, filed on Jul. 31, 2019, which is incorporated herein by reference in its entirety.

BACKGROUND

1. Field

Exemplary embodiments of the present disclosure relate to a host system including a memory system and a computing system including the memory system and the host system.

2. Description of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSD).

SUMMARY

Embodiments of the present invention are directed to a computing system in which the lifespan and reliability of a memory system are improved as a host system controls repair of a memory system.

In accordance with an embodiment of the present invention, a computing system includes: a memory system including a redundant memory area and suitable for counting the number of errors occurring in each memory location; and a host system suitable for detecting a defective memory location based on the number of the errors occurring in each memory location and controlling a repair operation of the defective memory location based on a current amount of data being processed between the host system and the memory system, wherein the memory system repairs the defective memory location using the redundant memory area.

In accordance with another embodiment of the present invention, a host system controlling a memory system includes: a detector suitable for detecting a defective memory location based on the number of errors occurring in each memory location of the memory system; a traffic monitor suitable for monitoring a current amount of data being processed between the host system and the memory system; and a repair controller suitable for controlling a repair operation of the defective memory location based on the current amount of data being processed.

BRIEF DESCRIPTION OF THE DRAWINGS

FIGS. 4A to 6B are flowcharts illustrating an operation of a computing system in accordance with an embodiment of the present disclosure.

DETAILED DESCRIPTION

Exemplary embodiments of the present disclosure will be described below in more detail with reference to the accompanying drawings. Embodiments may, however, be implemented in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, embodiments of the present disclosure will be described in more detail with reference to the accompanying drawings.

Figure 1:
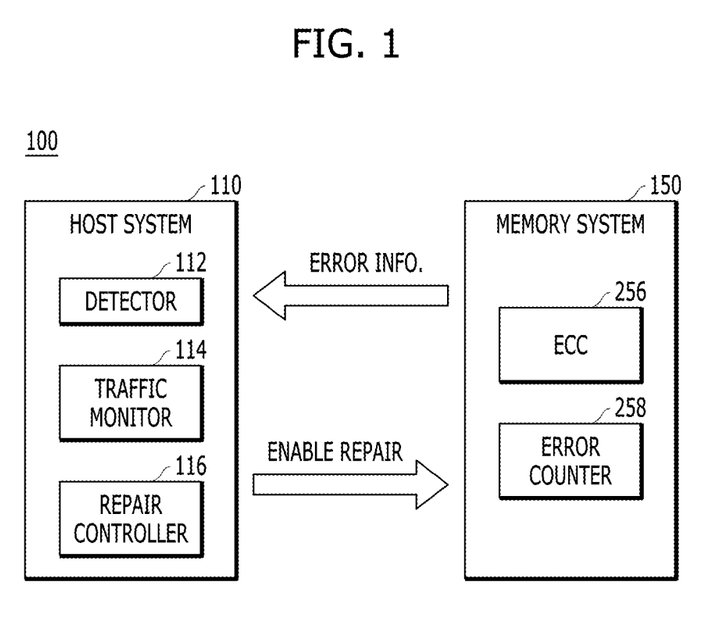
FIG. 1 is a block diagram schematically illustrating a structure of a computing system in accordance with an embodiment of the present disclosure.

FIG. 1 is a block diagram schematically illustrating a structure of a computing system 100 in accordance with an embodiment of the present disclosure.

The computing system 100 may include a host system 110 and a memory system 150 that interoperates with the host system 110. Memory system 150 may be controlled by the host system, and therefore may be referred to as a slave memory system 150.

The host system 110 may include at least one operating system (OS), which may manage and control overall functions and operations of the host system 110, and provide operation between the host system 110 and a user using the data processing system 100 or the memory system 150. The OS may support functions and operations corresponding to the use purpose and usage of a user. For example, the OS may be divided into a general OS and a mobile OS, depending on the mobility of the host system 110. The general OS may be divided into a personal OS and an enterprise OS, depending on the environment of a user.

The memory system 150 may operate under the control of the host system 110. The memory system 150 may store data for driving the host system 110 and provide the host system 110 with the data in response to a request of the host system 110. For example, the memory system 150 may include a Random Access Memory, such as LPDDR4 SDRAM, LPDDR5 SDRAM, DDR4, DDR5, and the like.

Errors in the memory system 150 may occur for various reasons. For example, an error may occur due to a defect of a memory cell itself inside the memory system 150, or an error may temporarily occur due to an electrical cause.

Despite the errors occurring in the memory system 150, there are methods for providing users with a memory system 150 having increased yield of the memory system 150 and high reliability.

When a memory cell itself is defective, errors may occur in the memory cell. When errors continue to occur in the same memory location, it is difficult to trust the data stored in the memory system 150. However, discarding the entire memory system 150 due to a limited number of defective memory cells may be inefficient in terms of the yield of the memory system 150. The memory system 150 may include redundant memory cells, and when a defective memory cell is detected during a test performed after packaging of the memory system 150, the defective memory cell may be repaired with a redundant memory cell.

When an error occurs temporarily in a memory cell which is not a defective memory cell, the error of the memory cell may be repaired by correcting the error and reading the data again. The memory system 150 may include an error correction code circuit 256 to correct the error. The memory system 150 may further store parity bits that are generated by performing an error correction encoding operation when the data are stored therein. The memory system 150 may be able to detect and correct a data error by performing an error correction decoding operation based on the data and the parity bits. The memory system 150 may write error-corrected data into a memory cell and output the error-corrected data to the host system 110.

A defect may occur while using the memory system 150 even in a memory cell that was not defective at the time of testing the memory system 150. If the memory system 150 is used when the host system 110 does not know whether an internal memory cell is defective or not, the memory system 150 may store erroneous data. When the memory system 150 stores erroneous data and the host system 110 operates based on the erroneous data, an error may occur in the host system 110. When the host system 110 detects a defect in a memory cell of memory system 150 and repairs the defective memory cell with a redundant memory cell of the memory system 150, an error may be prevented in the host system 110 and the lifespan of the memory system 150 may be extended.

According to the embodiment of the present disclosure, the memory system 150 may include the error correction code circuit 256 and an error counter 258. When the error correction code circuit 256 detects an error, the error counter 258 may count the number of errors for each memory location. For example, a memory location may correspond to a row of memory cells included in a memory cell array.

The host system 110 may include a detector 112, a traffic monitor 114, and a repair controller 116. The host system 110 may obtain the number of errors in each memory location from the memory system 150 in a predetermined cycle. The detector 112 may be able to detect the defective memory location based on the number of errors in each memory location. The repair controller 116 may control the memory system 150 to repair the defective memory location with redundant memory location.

Meanwhile, during the repair operation, the host system 110 may minimally access the memory system 150. When the memory system 150 receives an access command from the host system 110 during the repair operation, the memory system 150 may not be able to provide a response to the access command until the repair operation is completed. The repair controller 116 may control the repair operation when the memory system 150 is not used. According to the embodiment of the present disclosure, the traffic monitor 114 may determine whether the memory system 150 is being currently used or not based on the amount of data processing between the host system 110 and the memory system 150. In some embodiments of the present disclosure, the memory system 150 is not used when the host system 110 is booted up.

According to the embodiment, the host system 110 may ensure the reliability of the computing system 100 by detecting the occurrence of a defect in the memory system 150. When the host system 110 detects the occurrence of a defect in the memory system 150, the lifespan of the memory system 110 may be improved by controlling the repair operation of the defective portion of the memory system 150 instead of replacing the memory system 150. The host system 110 may prevent a response delay that may be caused by the repair operation of the memory system 150 by controlling the repair operation of the memory system 150 when the memory system 150 is not used.

Figure 2:
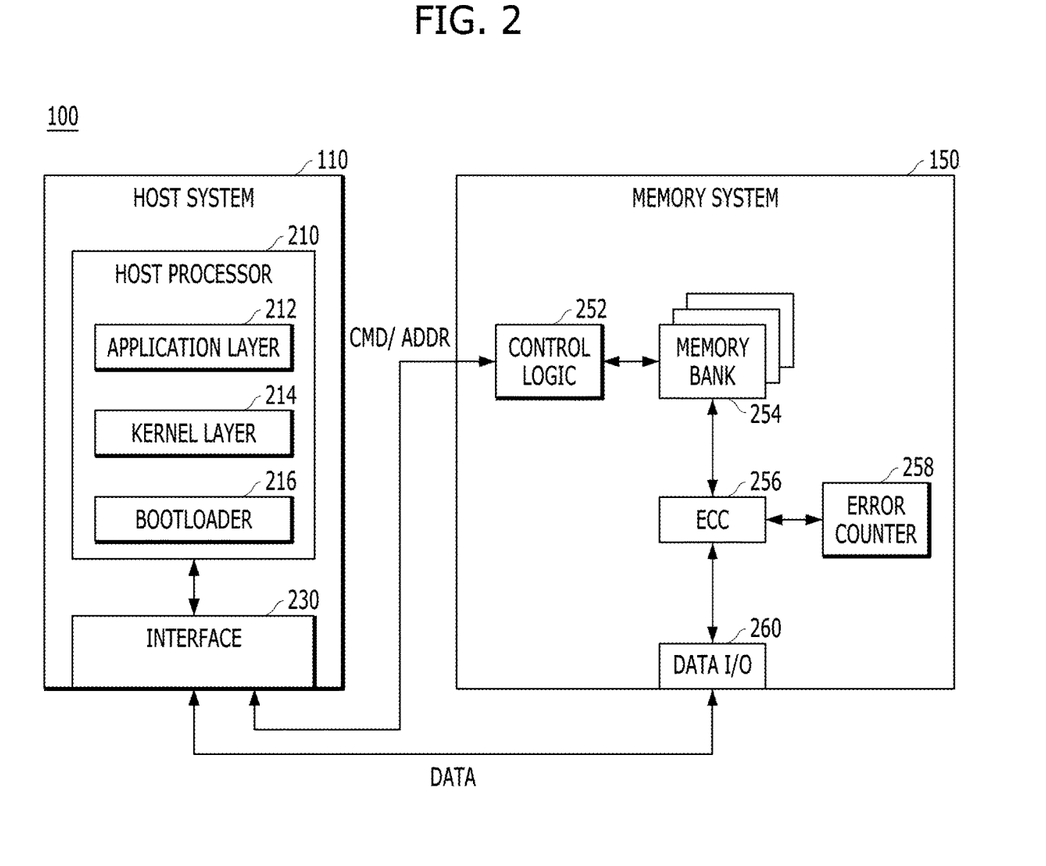
FIG. 2 is a block diagram illustrating a structure of a computing system in accordance with an embodiment of the present disclosure.

FIG. 2 is a block diagram illustrating a structure of the computing system 100 in accordance with an embodiment.

As described with reference to FIG. 1, the computing system 100 may include a host system 110 and a memory system 150.

The host system 110 may include a host processor 210 and an interface 230. The host processor 210 may control the overall operation of the computing system 100.

The interface 230 may support interfacing between the internal constituent elements of the computing system 100. For example, the interface 230 may be a chipset or a memory controller that supports interfacing between the host processor 210 and the other constituent elements of the computing system 100. The interface 230 may support interfacing between the host processor 210 and the memory system 150. The computing system 100 may further include a storage system (not shown), and the interface 230 may support interfacing between the host processor 210 and the storage system.

The host processor 210 may drive a boot loader 216 and an operating system. When power is supplied to the computing system 100, the host processor 210 may load the boot loader 216 stored in the storage system onto the memory system 150. The host processor 210 may drive the boot loader 216 to complete preparation for loading the operating system and load the operating system stored in the storage system onto the memory system 150.

The host processor 210 may drive the operating system loaded onto the memory system 150. The operating system may use a host processor 210, a memory system 150, a kernel layer 214 that abstracts resources of an input/output device, and an application layer 212 that drives an application program. In an embodiment, the detector 112 and the traffic monitor 114 which are described with reference to FIG. 1, may be driven in the kernel layer 214. The repair controller 116 may be driven in the interface 230, but not limited thereto.

The memory system 150 may include a control logic 252, a plurality of memory banks 254, an error correction code circuit 256, an error counter 258, and a data input/output unit 260.

The memory banks 254 may include a memory cell array for storing data and peripheral circuitry. The structure of the memory banks 254 are described in detail with reference to FIG. 3. The control logic 252 may access the memory banks 254 in parallel. The memory banks 254 that are accessible in parallel may form a memory rank. Depending on how the memory system 150 is implemented, the memory system 150 may include a plurality of memory ranks.

The control logic 252 may control the memory banks 254 in response to commands from the host system 110. For example, when the control logic 252 receives a command and an address from the host system 110, the control logic 252 may provide the memory banks 254 with the command and the address. The control logic 252 may repair defective memory location by directing memory operations to a redundant memory cell in response to a repair command and an address from the host system 110.

The error correction code circuit 256 may be able to detect and correct an error of data stored in the memory banks 254. The error correction code circuit 256 may perform an error correction encoding operation and an error correction decoding operation. For example, the error correction code circuit 256 may perform an error correction encoding operation onto data to be stored in the memory banks 254 and add a parity bit to the data. The control logic 252 may divide and store the data having the parity bit added thereto into the memory banks 254. The error correction code circuit 256 may read and perform an error correction decoding operation on the data with the parity bit, which are distributively stored in the memory banks 254, to detect and correct an error included in the read data.

The error correction code circuit 256 may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the error correction code circuit 256 is not limited to any specific structure. The error correction code circuit 256 may include all circuits, modules, systems or devices for error correction.

The error counter 258 may count the number of errors in each memory location. For example, when the error correction code circuit 256 detects an error, the error counter 258 may increment an error count value corresponding to an address of the location in a memory bank 254 where the error is detected.

In an embodiment, the error counter 258 may store the number of errors per address in a list format in an internal memory space. The size of the memory space of the error counter 258 may not be sufficient to store the numbers of errors of all addresses of the memory system 150. Depending on how it is implemented, the error counter 258 may store the numbers of errors of a portion of addresses of the memory system 150. For example, the error counter 258 may add and/or remove addresses to and/or from the list according to a Least Frequently Used (LFU) algorithm.

In an embodiment, the error counter 258 may provide the host system 110 with requested data along with a flag bit indicating whether an error of the requested data has been corrected, instead of storing the number of errors per address in the internal memory. The kernel layer 214 may store the number of errors per address based on the flag bit.

The data input/output unit 260 may support data input/output between the host system 110 and the memory system 150.

The traffic monitor 114 may monitor the amount of data processed between the host system 110 and the memory system 150. For example, the traffic monitor 114 may determine that the current memory system 150 is in an idle state when the amount of data being processed is equal to or less than a threshold value.

The detector 112 may detect the defective memory location in the memory system 150 and store the detected defective memory location in a register of the host system 110. The detector 112 may detect the defective memory location based on the number of errors that are detected in each memory location that is counted by the memory system 150. For example, the detector 112 may periodically acquire a number of errors that have occurred in each memory location from the memory system 150, and determine a memory address associated with a number of errors that exceeds a threshold value as the defective memory location or the location of a candidate defective memory. In another example, the detector 112 may periodically acquire a location of a candidate defective memory associated with a number of errors that exceeds the threshold value from the memory system 150. The detector 112 may determine whether the candidate defective memory is actually defective by testing the candidate defective memory. In an embodiment, the detector 112 may implemented in software.

According to an embodiment, the error count threshold value may be stored in the boot loader 216. The boot loader 216 may provide the error count threshold value to the detector 112 or the memory system 150. The detector 112 or the memory system 150 may detect the location of a candidate defective memory based on the error count threshold value. The error count threshold value stored in the boot loader 216 may be changed by modifying the data of the boot loader that are stored in a storage system.

The repair controller 116 may control repairing the defective memory by sending a command to redirect a memory defective memory location to a location of a redundant memory cell when the memory system 150 is in an idle state. For example, the repair controller 116 may provide the memory system 150 with a repair command when the traffic monitor 114 shows that the amount of data being processed by the memory system 150 is equal to or less than the threshold value. For example, the repair controller 116 may determine that the memory system 150 is not being used when booting of the computing system 100 and may provide the memory system 150 with a repair command.

Figure 3:
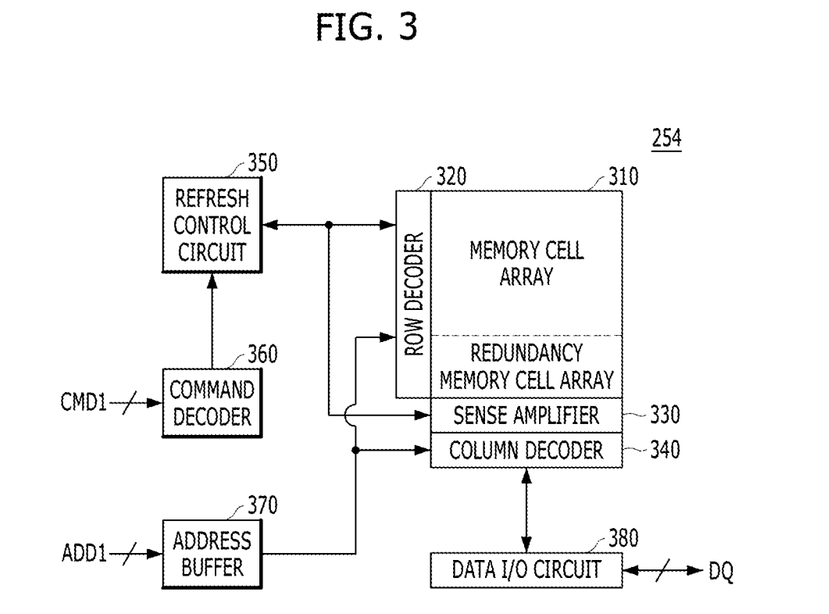
FIG. 3 is a block diagram illustrating a memory bank illustrated in FIG. 2

FIG. 3 is a block diagram illustrating the memory banks 254 illustrated in FIG. 2.

Referring to FIG. 1, the memory bank 254 may include a memory cell array 310, a row decoder 320, a sense amplifier 330, a column decoder 340, a refresh control circuit 350, a command decoder 360, an address buffer 370 and a data input/output circuit 380.

The memory cell array 310 may include a plurality of memory cells arranged in row and column directions. The plurality of memory cells may include not only memory cells used for storing data, but also redundancy memory cells for replacing memory cells in which an error has occurred. The redundant memory cells may have the same structure as the active memory cells, and a redundant memory cell array including the redundant memory cells may be used as the extra memory region of memory bank 254.

For example, the control logic 252 may replace a defective row containing a defective memory cell with a redundant row in response to a repair command from the host system 110. The control logic 252 may include an anti-fuse circuit (not shown). The control logic 252 may change the address signal corresponding to the defective row to the address signal corresponding to the redundant row by programming the anti-fuse.

The command decoder 360 may receive a command CMD1 from the control logic 252, and internally generate control signals by decoding the command CMD1. The control signals may include an active signal, read signal, write signal and refresh signal. The refresh control circuit 350 may receive the refresh signal from the command decoder 360, and output a row address to the row decoder 320 in order to refresh a word line of the memory cell array 310.

The controller may transmit an address ADD1 with the command CMD1 to the memory bank 254, the address ADD1 designating a memory cell to or from which data is to be written or read. The address buffer 370 may receive the address ADD1 from the controller and generate row and column addresses.

The row decoder 320 may decode the row address which is outputted from the refresh control circuit 350 or the address buffer 370 in order to designate one word line of the memory cell array 310. That is, the row decoder 320 may decode the row address outputted from the address buffer 370 and enable a word line coupled to a memory cell during a write or read operation. Furthermore, the row decoder 320 may refresh the word line corresponding to the row address outputted from the refresh control circuit 350.

The sense amplifier 330 may sense and amplify data of the memory cell coupled to the word line designated by the row decoder 320. The column decoder 340 may decode the column address outputted from the address buffer 370, in order to designate one or more bit lines coupled to one or more memory cells to or from which data is inputted or outputted.

The data input/output circuit 380 may output data received from the memory cell in the memory cell array 310 through the sense amplifier 330, or input data to the corresponding memory cell. As a result, data input through the data input/output circuit 380 may be written to the memory cell array 310 based on the address ADD1, or data read from the memory cell array 310 based on the address ADD1 may be output to the controller through the data input/output circuit 380.

Figure 4A:
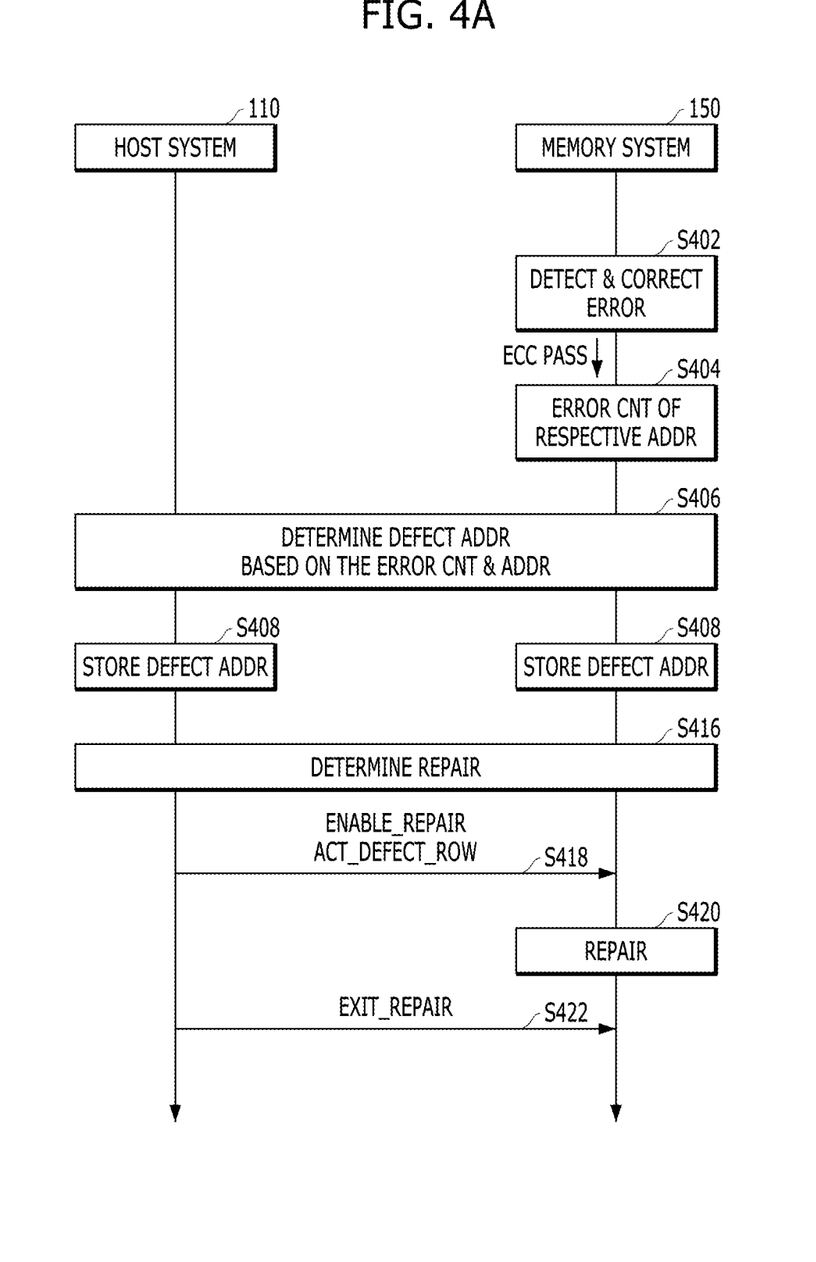
Figure 4B:
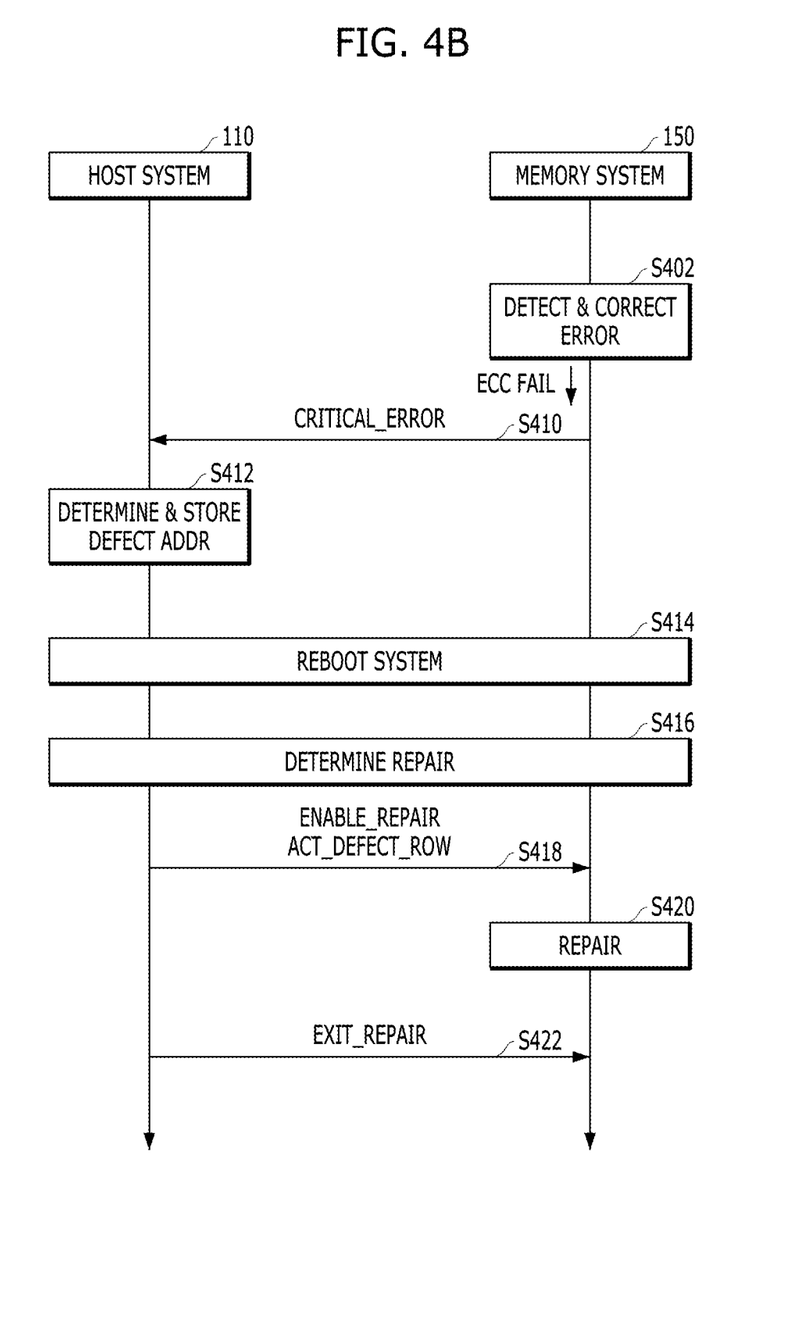

FIGS. 4A and 4B are flowcharts illustrating an operation of the computing system 100 in accordance with an embodiment.

FIG. 4A is a flowchart illustrating an operation of the computing system 100 when a correctable error is detected.

In step S402, the error correction code circuit 256 may detect and correct an error of data that are read from the memory banks 254.

In step S404, the error counter 258 may count the number of errors per memory address. For example, when error correction code 256 circuit detects an error bit of data, the error counter 258 may update the number of errors of an address corresponding to the memory location where the error bit is stored. According to an embodiment, the address may include rank information, bank information, and row information corresponding to the memory location. As described earlier with reference to FIG. 2, the error counter 258 may store the error counts of only some memory addresses according to the LFU algorithm.

In step S406, the detector 112 may detect the defective memory location based on the number of errors per memory address of the error counter 258. Examples of detailed operations of step S406 may be described with reference to FIGS. 5A and 5B.

In step S408, the host system 110 and the memory system 150 may receive defective address information corresponding to the defective memory location from the detector 112 and store the defective address information in an internal register or a designated portion of a storage in host system 110. The register or the storage may be implemented in a non-volatile memory.

In step S416, the repair controller 116 may determine whether to repair the defective memory location or not. The repair controller 116 may determine whether to perform a repair operation or not based on whether the host system 110 is using the memory system 150 or not. For example, the repair controller 116 may determine to perform a repair operation when the traffic monitor 114 determines that the memory system 150 is in an idle state. According to an embodiment, the repair controller 116 may determine that the memory system 150 is not to be used during booting and perform a repair operation. Examples of the detailed operations of the step S416 may be described with reference to FIGS. 6A and 6B.

When the repair controller 116 determines that a repair operation is to be performed, the repair controller 116 may enable a repair mode of the memory system 150 in step S418. For example, the repair controller 116 may provide the memory system 150 with a control signal to change the data of a corresponding mode register in order to enable the repair mode of the memory system 150. Also, the repair controller 116 may provide a signal to activate the defective memory location, for example, a defective row.

In step S420, the memory system 150 may perform a repair operation on the location of an activated defective memory. For example, the control logic 252 may program an anti-fuse to replace a defective address signal with an address signal corresponding to the location of a redundant memory, for example, a redundant row.

When the defective memory location is repaired, in step S422, the repair controller 116 may disable the repair mode of the memory system 150. For example, the repair controller 116 may provide a control signal to the memory system 150 to disable the repair mode after providing the active signal for the defective address and a predetermined time required for the repair operation passes. In some embodiments, the repair controller 116 may test whether the defective address is successfully replaced with a redundant address or not. For example, the repair controller 116 may provide the memory system 150 with a write command and a read command for the defective address for the test.

FIG. 4B is a flowchart illustrating an operation of the computing system 100 when an uncorrectable error is detected.

In step S402, the error correction code circuit 256 may detect and correct an error of data that are read from the memory banks 254.

If the error correction code unit 256 fails to correct the error, the memory system 150 may provide a critical error signal along with an address of the uncorrectable error to the host system 110 in step S410. The critical error signal may be a status flag or a sideband signal.

In step S412, the host system 110 may determine the address to defective address and store the detective address information in an internal register or designated portion of the storage in the host system 110.

In step S414, the host system 110 may reboot the computing system 100.

The computing system 100 may perform steps S416 to S422 same as those shown in FIG. 4A.

Figure 5A:
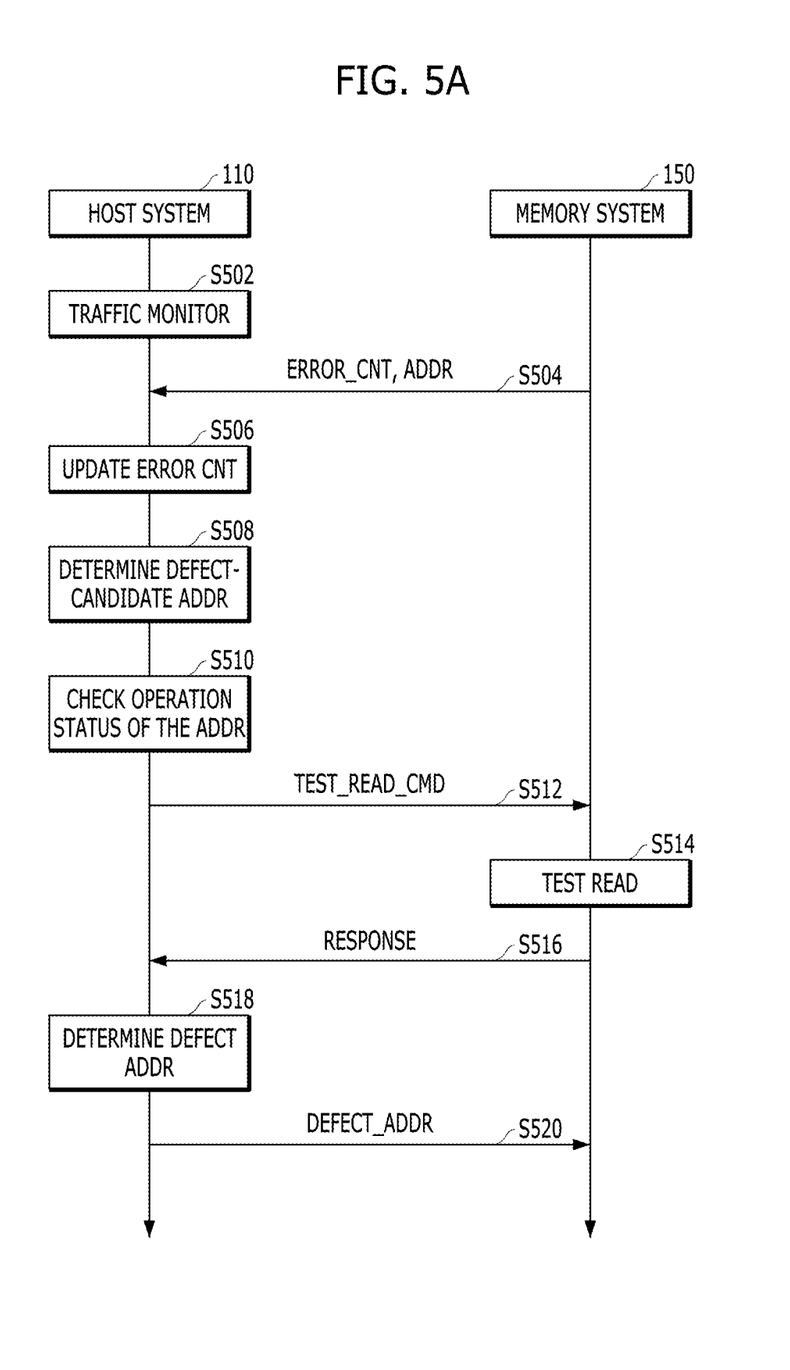

FIG. 5A is a flowchart describing a first example of detailed operations associated with step S406.

In step S502, the traffic monitor 114 may monitor the amount of data processed between the host system 110 and the memory system 150. The traffic monitor 114 may determine that the memory system 150 is in an idle state when the amount of data being processed is equal to or less than a threshold value.

When memory system 150 is in an idle state, in step S504, the detector 112 may obtain the number of errors per memory address from the memory system 150.

In step S506, the detector 112 may update the number of errors per memory address based on the number of errors per memory address that is obtained from the memory system 150.

In step S508, the detector 112 may determine a memory address whose number of errors is equal to or greater than the threshold value as a candidate defective address.

In step S510, the traffic monitor 114 may check the operation state of the location of a candidate defective memory corresponding to the defective candidate address. For example, the traffic monitor 114 may transform an address corresponding to a memory location of the memory system 150 into a system address used in the host processor 210. The traffic monitor 114 may determine whether the location of the defective candidate memory is currently accessed or not by referring to a page table (not shown) representing an operation state for each system address.

When the location of the defective candidate memory is currently being accessed, the traffic monitor 114 may check the operation state until the location of the defective candidate memory is no longer being accessed.

When the location of a defective candidate memory is not accessed, in step S512, the detector 112 may provide the memory system 150 with a test read command to test whether defective memory is present at the candidate defective address.

For example, the error correction encoded data may be divided and stored in the location of the candidate defective memory and the location of a memory that is accessed in parallel with the location of the defective candidate memory. The detector 112 may provide the memory system 150 with a test read command for the locations of a group of memories in which the error correction encoded data are divided and stored.

In step S514, the memory system 150 may perform a test read operation in response to the test read command. For example, the control logic 252 may provide the read command for the locations of the group of memories to be tested to the memory banks 254. The error correction code circuit 256 may perform error correction decoding on the data that are read from the memory banks 254.

In step S516, the memory system 150 may provide the detector 112 with a response including data indicating whether an error has occurred in the location of the defective candidate memory or not as a result of the error correction decoding operation.

In step S518, the detector 112 may determine whether memory at the candidate defective address is actually defective or not based on the response. For example, when an error occurs in the location of the defective candidate memory, the detector 112 may determine that defective memory is present at the candidate defective address.

In step S520, the detector 112 may provide the memory system 150 with the address of the defective memory. Alternatively, the detector 112 may store the address of the defective memory in the register or the designated portion of the storage in the host system 110.

Figure 5B:
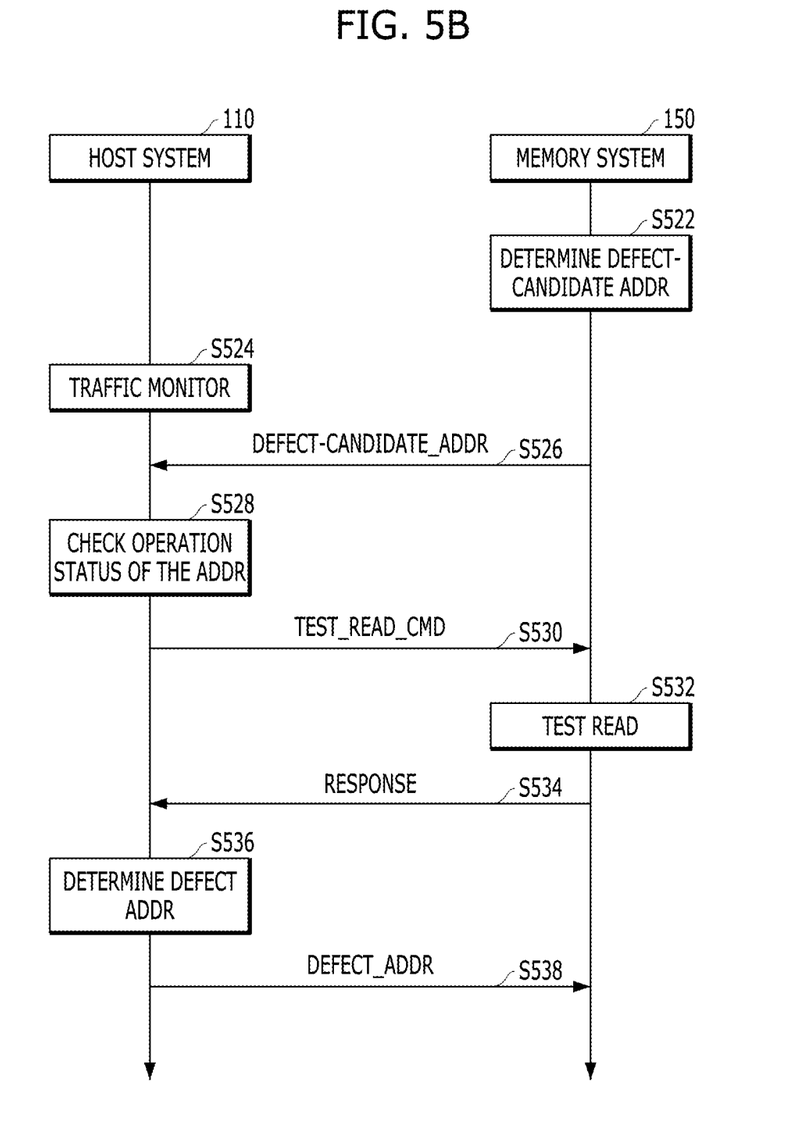

FIG. 5B is a flowchart describing a second example of detailed operations of step S406.

In step S522, the memory system 150 may determine a candidate defective address. For example, the error counter 258 may count the number of errors per memory address, and determine a memory address whose number of errors is equal to or greater than the threshold value as a candidate defective address.

In step S524, the traffic monitor 114 may monitor the amount of data processed between the host system 110 and the memory system 150 to determine whether the memory system 150 is in an idle state or not.

When the memory system 150 is in an idle state, in step S526, the detector 112 may obtain a candidate defective address from the memory system 150.

In step S528, the traffic monitor 114 may check an operation state for the location of the candidate defective memory corresponding to the candidate defective address.

When the location of the defective candidate memory is not currently being accessed, the detector 112 may provide the memory system 150 with a test read command in step S530.

In step S532, the memory system 150 may perform a test read operation for the location of the defective candidate memory in response to the test read command.

In step S534, the memory system 150 may provide the detector 112 with a response including data indicating whether an error has occurred at the location of the candidate defective memory as a result of the test read operation.

In step S536, the memory system 150 may determine that defective memory is present at the candidate defective address based on the test result.

In step S538, the detector 112 may provide the memory system 150 with the address associated with the defective memory.

Referring to FIGS. 5A and 5B, when the host system 110 and the memory system 150 detect a candidate defective address, the detector 112 may perform a test operation on the defective candidate address and then determine the defect candidate address with the defective address. According to an embodiment, the test operation for the defective candidate address may be omitted. For example, the detector 112 may immediately determine that defective memory is present at a memory address whose number of errors is equal to or greater than the threshold value without performing any testing.

Figure 6A:
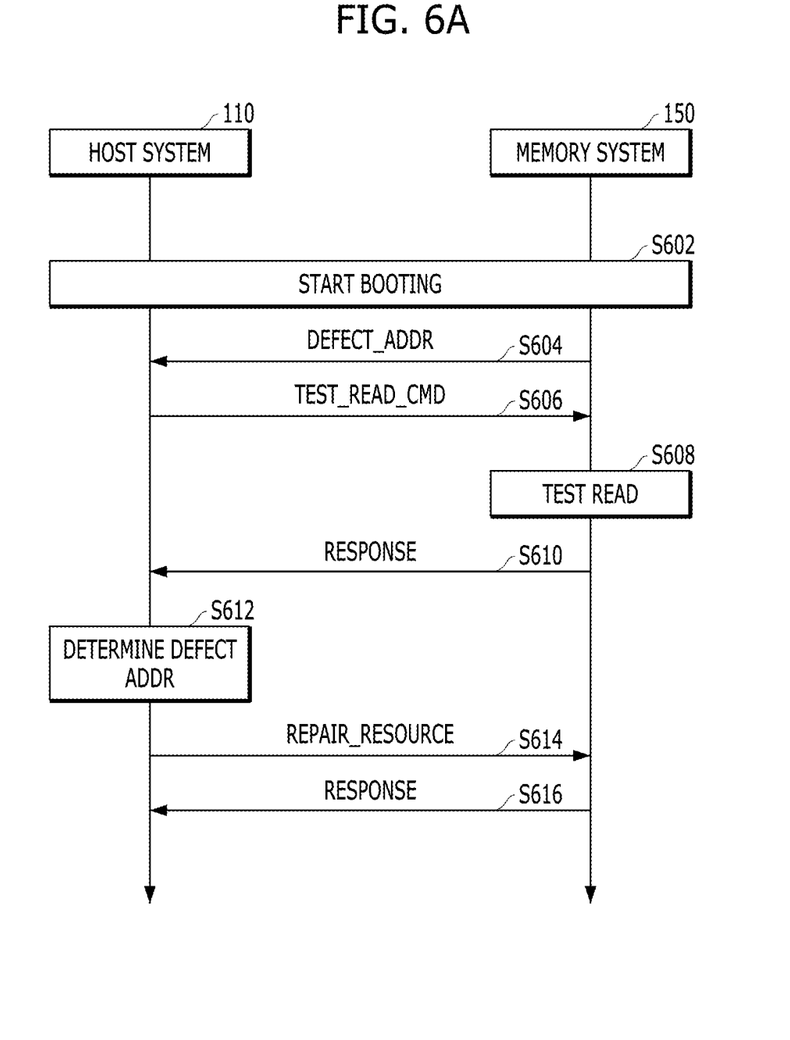

FIG. 6A is a flowchart illustrating a first example of detailed operations of step S416. FIG. 6A illustrates a repair operation in a static post-package repair (PPR) mode. In the static PPR mode, the computing system 100 may perform the repair operation during a boot process.

When power is supplied to the computing system 100 that is in an off state, the computing system 100 may start booting in step S602. The host processor 210 may search for a storage system in which the boot loader 216 is stored, and load the boot loader 216 onto the memory system 150. The boot loader 216 may create an environment for operating an operating system and load an operating system stored in the storage system onto the memory system 150.

As the operating system is loaded onto the memory system 150, the detector 112 and the traffic monitor 114 may be driven by the host processor 210. The boot loader 216 may provide the detector 112 or the memory system 150 with an error count threshold value stored in the boot loader 216 so that the detector 112 or the memory system 150 may detect an address of defective memory. In addition, the traffic monitor 114 may determine that the amount of data being processed when booting the computing system 100 is equal to or less than the threshold value.

In step S604, the detector 112 may acquire an address of defective memory stored in a non-volatile register of the memory system 150, the register or designated portion of the storage in the host system 110.

When there is no address of defective memory stored in the non-volatile register, the computing system 100 may complete booting without performing a repair operation.

In step S606, the detector 112 may provide the memory system 150 with a test read command to test whether memory of the obtained address is actually defective or not.

In step S608, the memory system 150 may test whether memory at the obtained address is actually defective or not by performing a read operation in response to the test read command and performing an error correction decoding operation of the read data. Alternatively, the control logic 252 may disable the ECC 256, write predetermined data into the memory location corresponding the obtained address before performing the read operation. The control logic 252 may determine the obtained address is actually defective or not by comparing the predetermined data with read data by the read operation.

In step S610, the memory system 150 may provide the detector 112 with a response including whether an error has occurred or not in the memory location corresponding to the tested address. 실용보tl: When no error is detected by the test, the computing system 100 may determine that the stored address is not associated with defective memory, and may terminate the booting without performing a repair operation.

When an error occurs in the test, the detector 112 may determine that there is an actual defect in memory at the address in step S612.

In step S614, the repair controller 116 may provide the memory system 150 with a control signal to determine whether there is a redundant row for a repair operation or not. For example, the memory system 150 may store data indicating whether a redundant row is available for each memory bank 254 in a mode register. The repair controller 116 may provide a control signal to read data indicating whether there is a redundant row of the memory bank 254 corresponding to the defective memory location in the mode register.

In step S616, the memory system 150 may provide a response indicating whether a redundant row of the memory bank 254 corresponding to the defective memory location is present.

When a redundant row is available for a repair operation, the repair controller 116 may perform a repair operation as described in the steps S418 to, and finish booting.

When there is no redundant row for a repair operation, the computing system 100 may finish booting without performing a repair operation.

In an embodiment, the computing system 100 may not perform the steps S606 to S612.

Figure 6B:
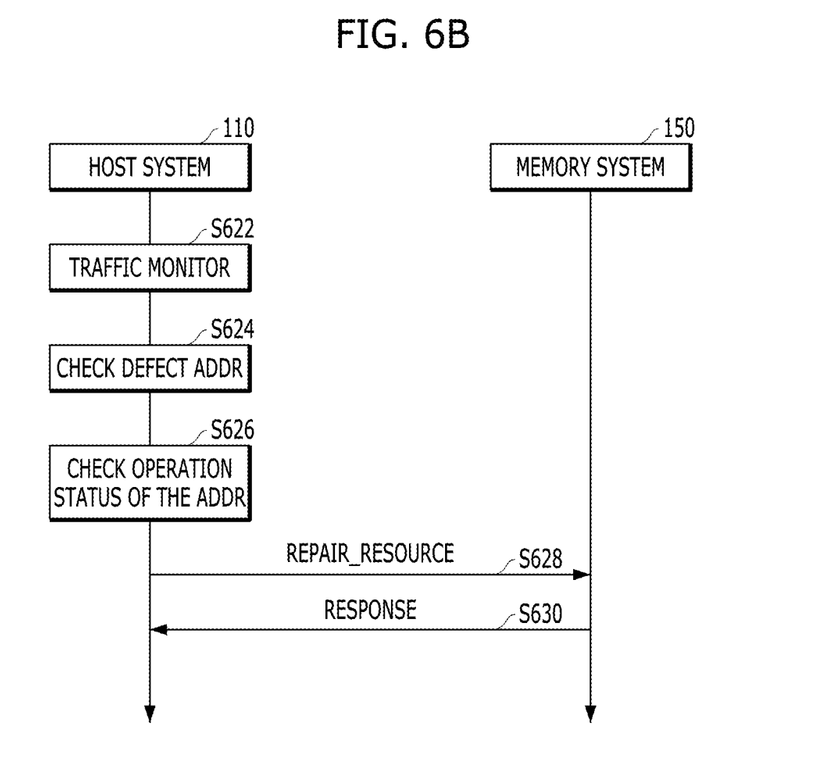

FIG. 6B is a flowchart describing a second example of detailed operation that may be performed in step S416. FIG. 6B illustrates a repair operation in a runtime PPR mode. In the runtime PPR mode, the computing system 100 may perform the repair operation in runtime instead of during the boot process.

In step S622, the traffic monitor 114 may monitor an amount of data being processed between the host system 110 and the memory system 150 to determine whether the memory system 150 is in an idle state or not.

When the memory system 150 is in an idle state, the detector 112 may check the stored address of defective memory in step S624.

When an address of defective memory is stored, in step S626, the traffic monitor 114 may check the operation state of the memory at the address by referring to the page table.

When the defective memory location corresponding to the defective address is currently being accessed, the traffic monitor 114 may continue to check the operation state until the defective memory location is not being accessed.

When the defective memory location is not being accessed, in step S628, the repair controller 116 may provide the memory system 150 with a control signal to determine whether a redundant row is available for a repair operation.

In step S630, the memory system 150 may provide a response that indicates whether a redundant row of the memory bank 254 to repair the defective memory.

When a redundant row is available for a repair operation, the repair controller 116 may block a traffic request from the host Processor 210 to the interface 230 and perform a repair operation on the defective memory according to steps S418 to S422 that are described with reference to FIG. 4.

According to an embodiment of the present disclosure, when a defect occurs in a memory of the memory system 150, the host system 110 may determine whether to repair the defective memory location or not. The host system 110 may consider whether the memory system 150 is being used by the host system 110 or not when determining whether to repair the defective memory location or not. The host system 110 may control the repair of the memory system 150 when the memory system 150 is not being used. According to an embodiment, the host system 110 may prevent response delays in the memory system 150 by accessing the memory system 150 during periods of inactivity. Also, a defective memory location is stored in the memory system 150, the reliability and lifespan of the memory system 150 may be improved by repairing only the defective memory location with a redundant memory cell.

According to embodiments of the present disclosure, the host system may be able to cure a defect that occurs later in a memory system by controlling a repair operation of the memory system. As a result, the reliability of data that are read from the memory system may be improved, and the lifespan of the memory system may be improved.

According to embodiments of the present disclosure, it is possible to provide a user with a quick response from the memory system by controlling the repair based on the amount of data processing of the memory system.

The technical problems to be achieved are not limited to the above-mentioned technical problems, and other technical problems that are not mentioned above will be clearly understood by those skilled in the art from the following description.

While the present invention has been described with respect to the specific embodiments, it will be apparent to those skilled in the art that various changes and modifications may be made without departing from the scope of the following claims.

What is claimed is:

1. A computing system, comprising:
   a memory system including a redundant memory area, the memory system being configured to count errors occurring in respective memory locations; and
   a host system configured to detect a defective memory location based on a number of the errors counted for each memory location, to monitor a current traffic between the host system and the memory system, and to control a repair operation to replace the defective memory location with the redundant memory area when current traffic is equal to or less than a threshold value.

2. The computing system of claim 1, wherein the host system determines that current traffic is equal to or less than the threshold value when the computing system is booted.

3. The computing system of claim 2, wherein the host system loads an error count threshold value from a boot loader when the computing system is booted and detects the defective memory location based on the error count threshold value.

4. The computing system of claim 1, wherein the host system determines whether to perform the repair operation based on whether a redundant memory area is available while the amount of data being processed is equal to or less than the threshold value.

5. The computing system of claim 4, wherein the host system causes the repair operation of the defective memory location to occur when the defective memory location is not being accessed while the current traffic is equal to or less than the threshold value.

6. The computing system of claim 1, wherein the host system detects the defective memory location by determining a location of a memory having a number of errors that is equal to or greater than a threshold value as the defective memory location.

7. The computing system of claim 1, wherein the host system detects the defective memory location by determining the location of a memory having a number of errors that is equal to or greater than a threshold value as a location of a candidate defective memory, and determines the location of the candidate defective memory as the defective memory location.

8. The computing system of claim 7, wherein the memory system tests the location of the candidate defective memory by reading data associated with the location of the candidate defective memory in response to a test command from the host system, and detects errors present in the read data.

9. The computing system of claim 1, wherein the memory system includes an error counter with an internal memory that stores the number of the errors counted for each memory location, wherein the error counter adds or removes a memory location to or from the counter memory according to a Least Frequently Used (LFU) algorithm.

10. The computing system of claim 1, wherein, when the memory system fails to correct an error occurred in a memory location, the host system determines the error-occurred memory location to the defective memory location, reboots the computing system and controls the repair operation.

11. The computing system of claim 10, wherein the memory system provides the host system with the error-occurred memory location along with a critical error signal.

12. A host system controlling a memory system, comprising:
a detector configured to detect a defective memory location based on a number of errors counted for each memory location of the memory system;
a traffic monitor configured to monitor a current traffic between the host system and the memory system; and
a repair controller configured to control a repair operation to replace the defective memory location with a redundant memory area included the memory system when the current traffic is equal to or less than a threshold value.

13. The host system of claim 12, wherein the traffic monitor determines that the current traffic is equal to or less than the threshold value when the host system is booted.

14. The host system of claim 13, wherein the traffic monitor loads an error count threshold value from a boot loader upon booting of the host system and detects the defective memory location based on the error count threshold.

15. The host system of claim 12, wherein the repair controller controls the repair operation for the defective memory location based on whether a redundant memory area is available while the current traffic amount is equal to or less than the threshold value.

16. The host system of claim 12, wherein the repair controller causes defective memory location to be repaired when the defective memory location is not being accessed while the current traffic amount is equal to or less than the threshold value.

17. The host system of claim 12, wherein the detector detects the defective memory location by determining a location of a memory whose number of errors is equal to or greater than a threshold value as the defective memory location.

18. The host system of claim 12, wherein the detector detects the defective memory location by determining the location of a memory whose number of errors is equal to or greater than a threshold value as a location of a candidate defective memory, and determining the location of the candidate defective memory as the defective memory location.

* * * * *